June 19, 1923.
1,459,365
F. J. DAINS
AUTOMOBILE BUMPER
Filed April 11, 1923
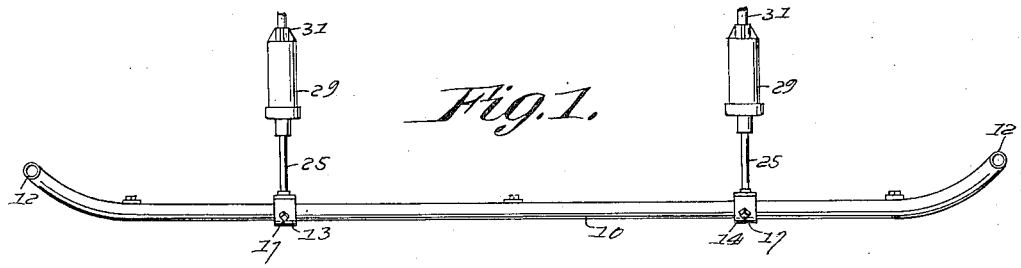
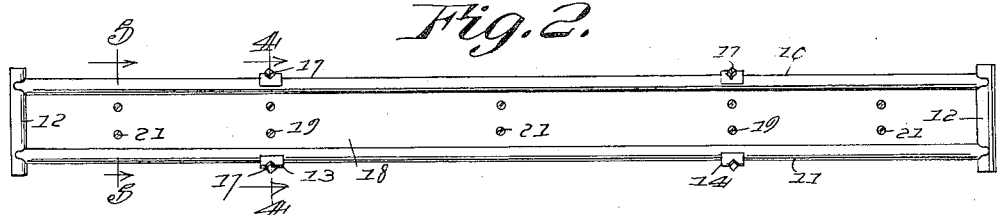
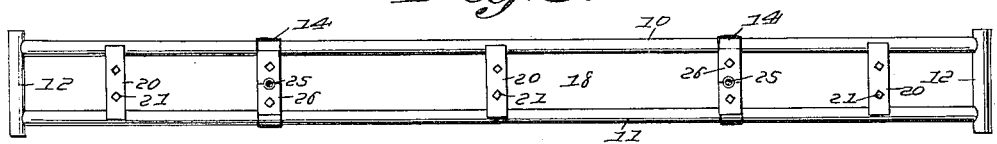
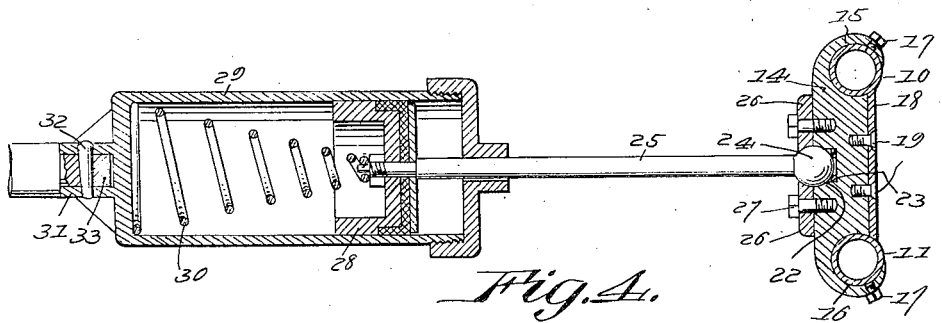
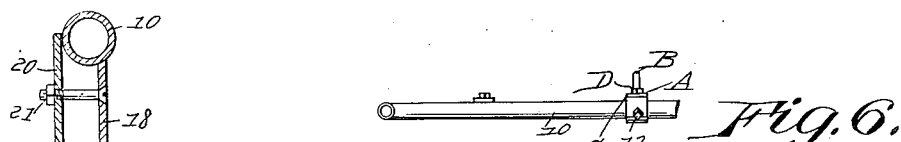
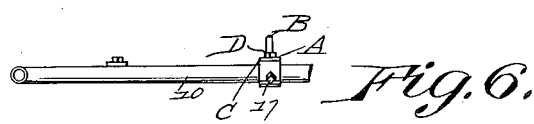
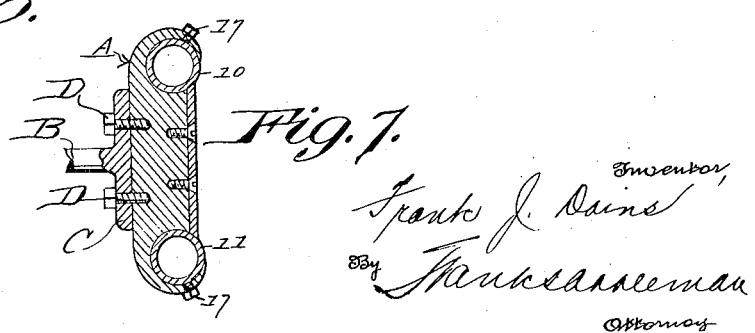

Patented June 19, 1923.

1,459,365

UNITED STATES PATENT OFFICE.

FRANK JOSIAH DAINS, OF CEDAR RAPIDS, IOWA.

AUTOMOBILE BUMPER.

Application filed April 11, 1923. Serial No. 631,421.

*To all whom it may concern:*

Be it known that I, FRANK JOSIAH DAINS, a citizen of the United States of America, and resident of Cedar Rapids, in the county of Linn and State of Iowa, have invented certain new and useful Improvements in Automobile Bumpers, of which the following is a specification.

This invention relates to bumpers for automobiles, and particularly to a bumper which is held in normal position on yieldable pistons, the said pistons being cushioned in their movement within cylinders by resistance elements, the said resistance elements, in the present embodiment of the invention, being shown as springs, but the inventor does not wish to be limited with respect to the resistance elements, since it is obvious that air or fluid may be relied upon to produce the resistance necessary to absorb shock, due to the impact of the bumper.

It is an object of this invention to provide a bumper associated with means for holding it in projected position with respect to the automobile, the said bumper being oscillatably mounted on its support in order that the said bumper may assume different positions to present its full face or area to the object with which it collides, a condition which will result in minimizing damage occasioned by collision, and the oscillatory movement afforded the bumper also serves to cause the force of the impact, due to a collision, to be communicated more nearly axially of the supports of the bumper, in order that the supports which, in the present embodiment of the inventinon, comprise piston rods, may move axially within the cylinders, thereby, to a great extent, avoiding lateral strain on the operating parts of the shock absorbing mechanism of the bumper.

It is a further object of this invention to provide a bumper mounted for articulation in the manner indicated, and provided with means for frictionally retaining the bumper at different positions of adjustment, in order that when the bumper and its shock absorbing mechanism is installed, the bumper may be moved to present its outer face in a vertical position, regardless of the position of the bumping mechanism, within predetermined bounds.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of a bumper embodying the invention;

Figure 2 illustrates a front view thereof;

Figure 3 illustrates a rear view of the bumper head with the piston rods in section;

Figure 4 illustrates an enlarged sectional view on the line 4—4 of Fig. 2;

Figure 5 illustrates a sectional view on the line 5—5 of Fig. 2;

Figure 6 illustrates a plan view of a fragment of a bumper embodying a modification; and Figure 7 illustrates a sectional view thereof.

In these drawings a bumper is illustrated as comprising an upper and lower bar 10 and 11 respectively, that are in spaced relation to and parallel with each other, and the said bars are preferably connected together at their ends by vertically disposed tubular members 12 and these members 12 may be secured to the bars by welding or the like.

The bars 10 and 11 are adjustably secured on two heads 13 and 14 that are of identical construction, and therefore, a description of one will suffice for an understanding thereof by one skilled in the art. Each head has sockets 15 and 16 in its ends in which the bars 10 and 11 respectively are seated, and in order that the bars may be held at different positions of adjustment, set screws 17 are threaded through those parts of the head having the sockets and the set screws bear against the bars. The purpose of having this adjustable feature is that the heads may be moved on the bars to space them properly with relation to the width of the frame of an automobile or other structure to which the shock absorbing mechanism of the bumper is to be anchored, as will presently appear.

A face plate 18 fits between the bars 10 and 11 and the face plate is secured to the heads by fastenings 19 such as screws, and at suitable locations between the ends of the bars clips 20 are attached to the plate by fastenings 21 such as screws or the like. The clips bear against the rear surfaces of the bars and the fastenings serve to draw the plate and clips into frictional engagement with the bars so that the parts are retained in the assembled relations shown.

Each head has a seat 22 preferably provided with a friction washer or ring 23 that is engaged by the ball or enlarged spherical end 24 of the piston rod 25. An apertured plate 26 fits over the piston rod and bears against the ball, thereby forming with the head and ball what might be termed a universal joint which will permit oscillatory motion of the bumper on the piston rod. The plate is secured to the head by fastenings 27 such as screws or the like, and provision may be made for an adjustment by which pressure on the ball may be increased or diminished.

The shock absorbing mechanism of the bumper includes a piston 28 on each of the piston rods and the pistons operate in cylinders 29 with absorbing elements 30 in the nature of springs within the cylinders, one end of each spring bearing against an end wall of a cylinder and the other end against the piston therein, the said spring, of course, yielding under impact, should a collision occur.

Any suitable means may be provided for attaching the cylinders to the chassis of an automobile, and the cylinder is here shown as having integral apertured flanges 31 that receive an anchoring device such as a pin 32 extending through a lug 33, or other part of a device to which the cylinders are to be anchored. The particular means by which the cylinders are connected to the automobile or the like is an immaterial detail of construction and may be varied to suit particular requirements. The inventor does not therefore wish to be limited with respect to these details, but they are shown for the purpose of disclosing one form of an operative device.

The fastening 32 may likewise be changed, as will be understood.

In the modification shown in Figs. 6 and 7, the head A and the parts associated with it in the formation of the bumper itself, are the same as those heretofore described in connection with the explanation of the mechanism shown in the other figures of the drawing, but in this modified construction the heads are connected to piston rods B by rigid joints. The piston rods have apertured flanges C that receive fastenings D such as screws passing through the flanges and anchored to the head so that a rigid connection is made, as stated, between the head and the pistons.

Under certain conditions of use, this embodiment of the invention may be employed as a substitute for the form heretofore described.

I claim:

1. In a bumper for automobiles, heads having an upper and lower bar secured to them, a plate in front of the bumper filling the space between the bars, means for holding the plate in place, piston rods, means for oscillatably mounting the heads on the piston rods, and shock absorbing mechanism with relation to and in connection with which the piston rods are assembled.

2. In a bumper for automobiles, heads having an upper and lower bar secured to them, a plate in front of the bumper filling the space between the bars, means for holding the plate in place, the said heads having seats in their rear faces, piston rods having balls lying in the seats, means for frictionally retaining the balls in the said seats, and shock absorbing mechanism with relation to and in connection with which the piston rods are assembled.

3. In a bumper for automobiles, heads having an upper and lower bar secured to them, piston rods, means for oscillatably mounting the heads on the piston rods, and shock absorbing mechanism with relation to and in connection with which the rods are assembled.

4. In a bumper for automobiles, heads having an upper and lower bar secured to them, piston rods connected to the heads and shock absorbing mechanism with which the piston rods coact.

5. In a bumper for automobiles, heads having an upper and lower bar secured to them, means for holding the bars at different positions of adjustment with relation to the heads, the said heads having seats in their rear faces, friction elements therein, piston rods having spherical heads fitting in the seats, plates adjustably secured to the heads and bearing against the spherical heads of the piston rods for frictionally retaining the bumper at different positions of adjustment with relation to the heads, and shock absorbing mechanism with relation to which the pistons operate.

6. A bumper for automobiles comprising shock absorbing elements including cylinders, pistons operating in the cylinders, means within the cylinders for retarding the movement of the piston heads having an upper and lower bar secured to them, a front plate between the bars filling the space therebetween, means for holding the plate in place, balls on the outer ends of the piston rods lying in seats of the heads, and means for frictionally retaining the balls in said seats.

FRANK JOSIAH DAINS.